United States Patent
Zander (10) Patent No.: US 6,453,310 B1
(45) Date of Patent: Sep. 17, 2002

(54) INSTALLABLE SCHEMA FOR LOW-OVERHEAD DATABASES

(75) Inventor: Jason L. Zander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/178,907

(22) Filed: Oct. 26, 1998

(51) Int. Cl.7 .............................................. G06F 17/00
(52) U.S. Cl. .............................. 707/1; 707/10; 707/200
(58) Field of Search ..................... 717/1–5; 707/1–206; 709/100–332; 714/25; 710/36

(56) References Cited

U.S. PATENT DOCUMENTS

| 5,926,810 A | * | 7/1999 | Noble et al. | 707/4 |
| 6,151,643 A | * | 11/2000 | Cheng et al. | 709/200 |
| 6,163,776 A | * | 12/2000 | Periwal | 707/4 |
| 6,175,837 B1 | * | 1/2001 | Sharma et al. | 707/102 |

OTHER PUBLICATIONS

Critchlow et al., "DataFoundry: information management for scientific data", IEEE Transactions on Information Technology in Biomedicine, pp. 52–57, vol. 4, No. 1, Mar., 2000.*

Grant et al., "Logic–Based Query Optimization for Object Databases", IEEE Transactions on Knowledge and Data Engineering, pp. 529–547, vol. 12, No. 4, Jul./Aug., 2000.*

Crestana–Jensen et al., "Consistent Schema Version Removal: An Optimization Techique for Object–Oriented View", IEEE Transactions on Knowledge and Data Engineering, pp. 261–280, vol. 12, No. 2, Mar./Apr. 2000.*

Brobowski et al., "Oracle 7 Server, Concepts Manual", Oracle Corporation, Dec., 1992.*

* cited by examiner

Primary Examiner—Thomas Black
Assistant Examiner—David Jung
(74) Attorney, Agent, or Firm—Amin & Turocy, LLP (57) ABSTRACT

A relational database has a data file stored separately from a representation of the schema of the relational data in the data file. Schema representation files of several different types are generated by compiling a human-readable script defining the schema. One of the schema files is linked to its corresponding data file by a pointer, so that an application program invoking a database engine can find the schema for processing the data file. Another type of schema file can be included in an application program, so that the application can process the data file via the database engine without accessing any other schema information.

38 Claims, 4 Drawing Sheets

INSTALLABLE SCHEMA FOR LOW-OVERHEAD DATABASES

COPYRIGHT DISCLAIMER

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention pertains to electronic data processing, and more particularly concerns reducing the overhead associated with small databases, especially for computers having limited capacity.

Conventional relational databases such as Microsoft® Access and SQL Server are flexible and powerful. However, they are large programs, and they are optimized for large databases, concurrent access by multiple users, and ease of modifying data.

One of the consequences of this optimization is that the overhead of each database is relatively high, both in storage space and in performance. In particular, conventional databases must store a schema that is developed anew by the database program for each database. A relational database is made up of one or (usually) more tables. Each table is a set of records or rows having data in a defined set of columns. The data in each column is defined to be of a certain type, and may also have value restrictions, such as uniqueness or not null. Indexes can be defined on certain table columns. This information about the database is its schema. Database programs employ a data definition language whereby a user can define and modify the schema of a database. Because the data definition language (DDL) is typically the only facility for manipulating the schema of a database, a user (or, more likely, a database administrator) must create every new database essentially by hand. Again, for large databases having multiple users, this is not a problem.

Some existing relational databases management systems (DBMSs) provide a scripting tool for writing schemata outside the DDL, and application program interfaces (APIs) that a programmer can call directly. When a schema is placed into the database, the database allocates space in its file system for the user-defined schema. Such a database is self-contained, but it still has the storage and performance overhead of a schema defined by a DDL.

Some other applications only distantly related to databases, employ a description of a multicomponent object such as a document. The XML (Extended Markup Language) standard, an extension of the tag-based HTML (Hypertext Markup Language) can include a description of how the various components of a compound document are organized. This description, however, refers to multiple independent components, and does not describe an organization of a data file suitable for a database.

An increasing range of applications, however, could advantageously employ the power of the relational model for a large number of smaller databases, especially those normally accessed only by single users who mostly read the data, and write new data infrequently. For example, component libraries containing class and type definitions for programming systems need to be widely distributed, and seldom modify their data. As another example, address books in hand-held personal computers and similar applications are the antithesis of the databases for which relational databases are designed. These applications have many copies of similarly defined small, single-user, read-mostly databases.

Today, many such applications employ one-off database programs of very limited power and flexibility. Consequently, there is a need for processing large numbers of relatively small data bases without incurring either the storage and performance penalties of conventional relational database management systems or the limitations of individually written database programs.

SUMMARY OF THE INVENTION

The performance and storage overhead of relational databases increases greatly as the amount of data in the database decreases. The present invention increases performance and decreases storage requirements for small databases by providing simplified "pluggable schemas" for relational databases that are stored and accessed separately from the data in the database. A developer creates a representation of a standalone schema definition and installs only a reference to the schema in a database. The installation of the schema is performed by client code that compiles the representation into an application program for using the database. The client code passes a pointer to this compiled definition to a database engine. The engine then accesses this definition directly for providing full read/write access to the data in a particular instance of the database.

DETAILED DESCRIPTION OF THE INVENTION

The following detailed description of preferred embodiments refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those in the art. The following description is therefore not to be taken in a limiting sense, and the scope of the inventions is defined only by the appended claims.

Figure 1:
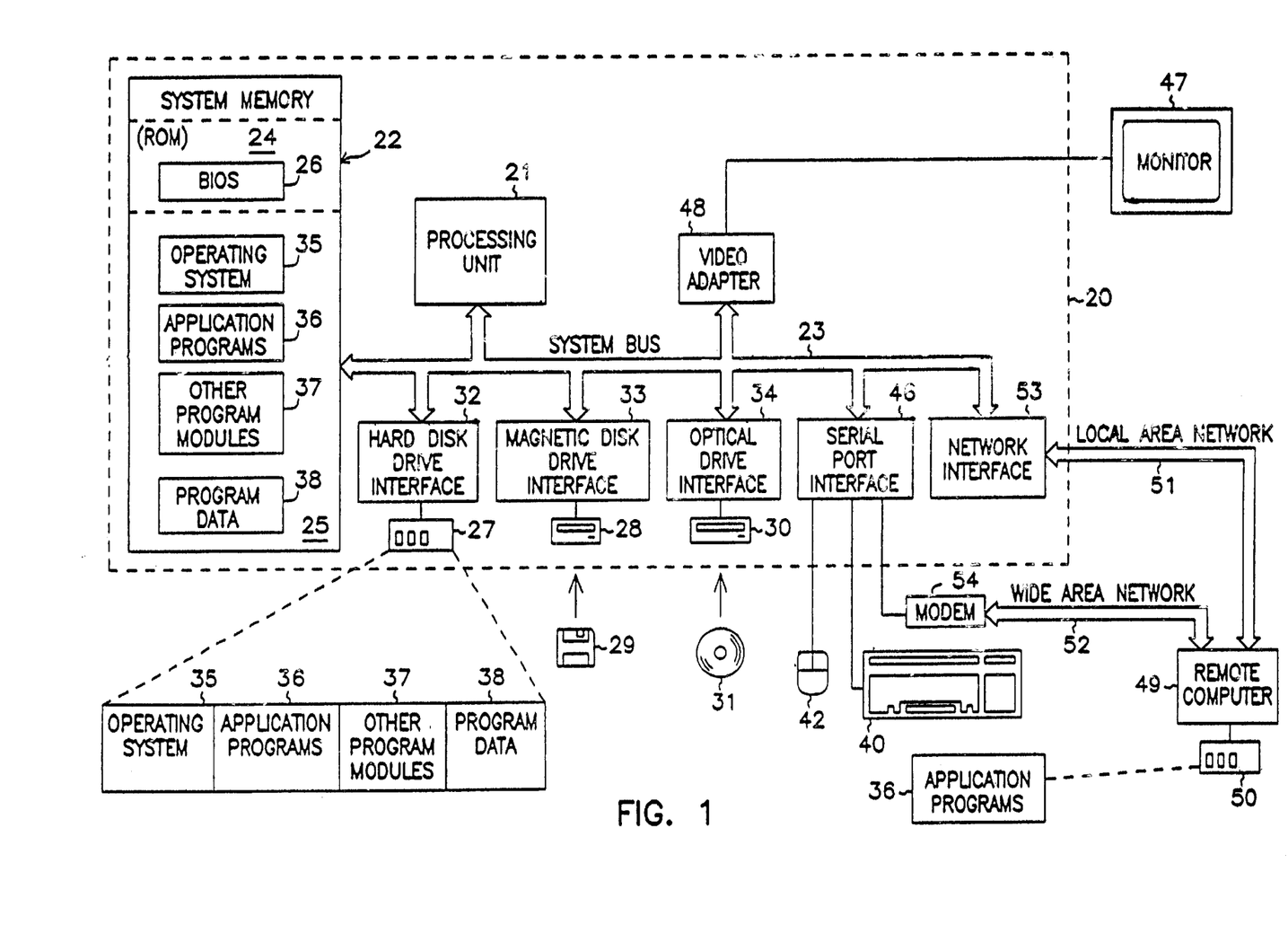
FIG. 1 is a block diagram of an environment for carrying out the invention.

FIG. 1 shows a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those in the art will appreciate that the invention may be practiced with other computer-system configurations, including hand-held devices, multi-processor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

The environment of FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1.

The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Figure 2:
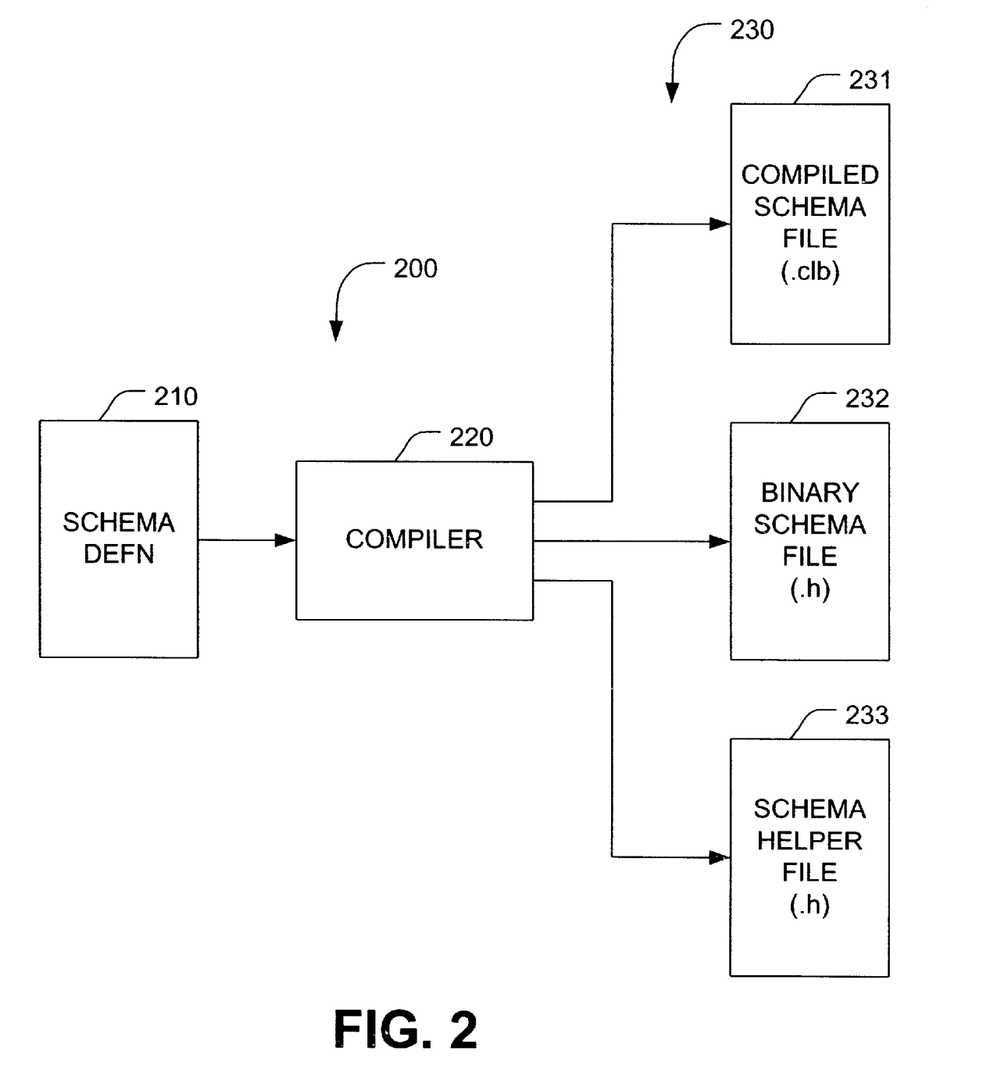
FIG. 2 is a diagram of data and program components for creating schema representations according to the invention.

FIG. 2 describes data and program components 200 for generating schema representations that can be stored and accessed externally to a relational database. This description uses the continuing example of a simple database for employee information. Script file 210 is a human-readable file by which a designer defines the schema of a relational database. A conventional SQL database system would define a schema having three tables of employee information and two indices with DDL statements such as the following:

create table Employee (empid int pk, FirstName varchar (64), LastName varchar (64), dateofbirth DATETIME);

create table Emp401k (empid int, AcctID int, Deduction currency);

create unique hash index Emp401kIDs on Emp401K (empid, AcctID);

create table EmpReview (empid int, ReviewDate DATETIME, Score short);

create unique hash index ReviewDex on EmpReview (empid, ReviewDate);

File 210 employs a similar format:

declare schema Emp401k, 1, {0E8C9097-650B-11d1-B748-00C04FC32480};

create table Employee (empid int pk, FirstName varchar (64), LastName varchar (64), dateofbirth DATETIME);

create table Emp401k (empid int, AcctID int, Deduction currency);

create unique hash index Emp401kIDs on Emp401K (empid, AcctID);

create table EmpReview (empid int, ReviewDate DATETIME, Score short);

create unique hash index ReviewDex on EmpReview (empid, ReviewDate);

The first line of file 210 declares the schema definition. The subsequent lines define the tables, the columns of each table, and the data type of each column in a conventional manner.

declare schema <Name>, <version>, <sid>;

declares a schema by specifying a mnemonic name, a version number, and a schema identifier, which is a conventional 16-byte globally unique identifier (GUID). The above statement is the only new syntax required by the invention; the remainder closely follows standard ANSI SQL syntax.

```
create table <Name>
<colname> DBTYPE_<type>[(<size> | nolimit>) | (<rowstart for
rid>)] [pk] [nullable]
[, <column def>]
[, pk(<colname>,<colname>)]
);
``` creates a table definition. One or more columns may be marked as the primary key ("pk"), whose function is described later.

```
create [unique | pk] [hash | sorted |clustered] [transient]
index <Name> on <Name> (<column> [,<column>]) [, minrows=%d] [,
buckets=%d] [, maxcollision=%d]
[, [ascending | descending]];
creates a new index definition on an existing table.
extend table <sid>. <Name>
(
<colname> DBTYPE_<<type>[(size)] nullable
[, <column def>]
);
``` extends the definition of an existing table by adding a new column.

header (on);
    . . . . .
    header (off);
places all statements between the "header (on)" and "header (off)" tags directly into the structs header file described later.

A compiler 220 translates definition script file 210 into three different kinds of files 230 representing the schema. A standalone binary (.clb) schema file 231 contains a compiled version of the schema data that can be referenced directly. This file is needed only to provide schema definitions and data to applications that did not have access to file 232, below, when that file was compiled. It can be installed on a user's computer separately from any other program, in a location where the database engine can find it.

A binary schema file 232 is a C-language header file that contains the same schema data as file 231, a set of well-named data structures with initial data. The format of a data values is a binary dump of the compiled schema. A C compiler translates this source code into compiled data that can be included in a user's application program.

A developer can include this file as data in an application program so that the schema is hard-coded into the application. Although forfeiting flexibility, this approach provides very fast access to the data in the database. A helper file 233 contains definitions of the database tables in the schema in the form of C-language structures (structs). A set of macros in file 233 identify the tables numerically, and another set of macros identify table columns numerically. Some of these values can then be used in conjunction with conventional APIs for manipulating databases directly.

Figure 3:
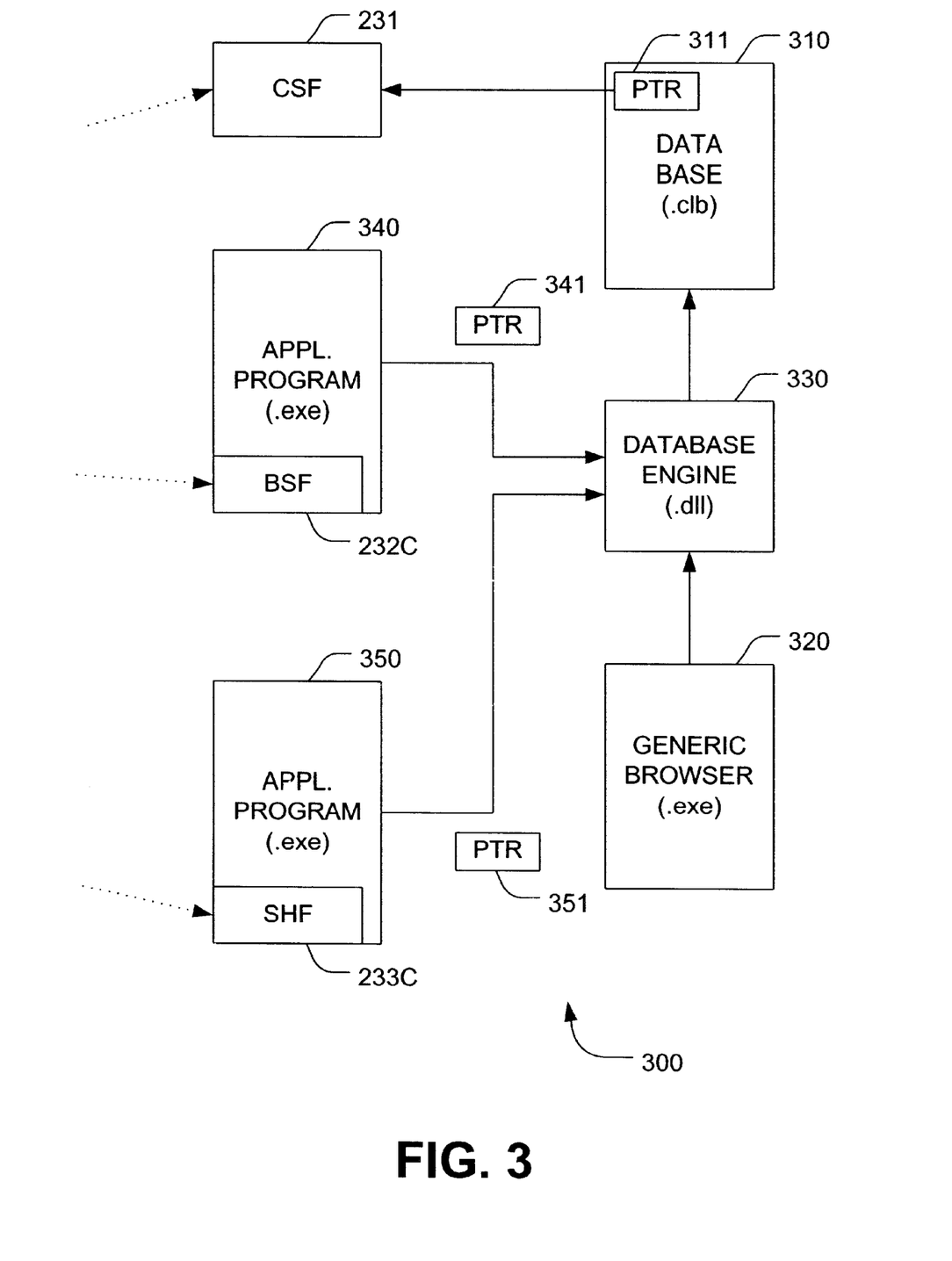
FIG. 3 is a diagram of components for processing databases according to the invention.

FIG. 3 illustrates data and program components 300 for manipulating databases having an external pluggable schema. Although these components might be located on the same computer as components 200, the normal situation is that a large number of users each have their own copies of components 300 on different computers. The following description concerns the components of a single user. File 310 contains data for one instance of a database having one or more plugged-in schemata. The schema of each user's database is the same, but the actual data usually differs for each user.

Database engine 330 accesses the contents of the data in file 310, employing a schema description to decipher the layout of the data in the file. Engine 330 is shown as a dynamic link library (.dll) file; it could, however, be realized as any form of executable. Its functions are conventional, except that it can access an external schema file via a pointer, rather than using only a schema stored internally to a database. It can be optimized in conventional ways for small, single-user, read-mostly databases. For example, it need not allow concurrent writes by multiple users, and it might rewrite an entire table for every record that is newly inserted.

The schema description takes one of three forms:
(a) A binary version of the schema stored inside the database file, as in conventional practice.
(b) A pointer to the schema as compiled into a user's application program; (c) The file 231 copied to the user's machine and stored in a known location external to the database file itself.

Many of the uses for the invention incorporate schema files 232C and 233C into an application program, case (b) above. These files result from placing files 232 and 233, FIG. 2, into the source code of programs 340 and 350, and then compiling the programs.

A client application program such as 340 may perform any desired overall function. Program 340 contains a compiled version of the schema, 232C, stored as data in the program. When this client opens or creates the database, it calls database engine 330 and sends a pointer 341 to this data. The program can thereafter call other APIs on the database engine to work with tables and records of database 310. The advantage of giving the direct pointer to this data, instead of looking up a separate file 231, is performance; finding a separate file takes time, and it might not even be present if the developer had chosen not to make it public. Client application 340 must add the schema every time it opens the database, allowing engine 330 to access the schema definition and read the database data 310 correctly. Again, the engine itself is not aware of the schema of the database, and the schema need not be stored with the data.

Application program 350 utilizes the schema helper source code found in file 233. These schema helpers are source-code macros. The compiler that translates the program converts their usages into constant values and structure layouts. Certain conventional APIs in engine 330 can employ them to perform fast operations such as reading and writing data. A single application program might have either of the files 232C and 233C, both of them, or neither.

Where numerous different databases 310 reside on the same computer, a generic browser program 320 allows a user to invoke database engine 330 to query and modify data on any of the databases. Although it can access any schema installed in the database itself, a system according to the invention need not have an internal schema. To provide for this case, case (c) above, database 310 includes a pointer 311 to standalone schema file 23 for that database. The first 16 bytes of the pointer contain a standard globally unique identifier (GUID) for the particular schema file 231. This requires that the schema files 231 for all databases 310 on the computer be accessible to the computer; they can be stored in a local catalog if desired. Although the generic browsing capability requires storing a small pointer 311 to the schema in the database, it avoids the overhead of storing the very much larger schema itself in the database. In some cases, it might be desired to make a database opaque to all but authorized browsers; merely eliminating the file 231 for such a database then prohibits generic browsers from accessing the data.

Browser 320 illustrates the case of an application program that has no internal schema representation, neither a file 232C nor a helper file 233C. That is, any application program can access a database 310, even without storing its schema internally in the application, by means of a standalone schema file 231. Browsers are not the only applications in which files 231 are advantageous.

Again, FIG. 3 depicts components 300 on the computer of a single user. Such a user may have many different data files 310, each having its own organization, and thus its own schema file 231. Different application programs such as 340 and 350 can operate upon different data files 310, and thus multiple programs on the same user machine can include different schema files 232. Multiple users can have any combination of the above configurations. Furthermore, for a purpose such as a component library, an address book, and many others, different users will commonly have database files 310 containing different data, all of which employ the same schema files 231 or 232.

Figure 4:
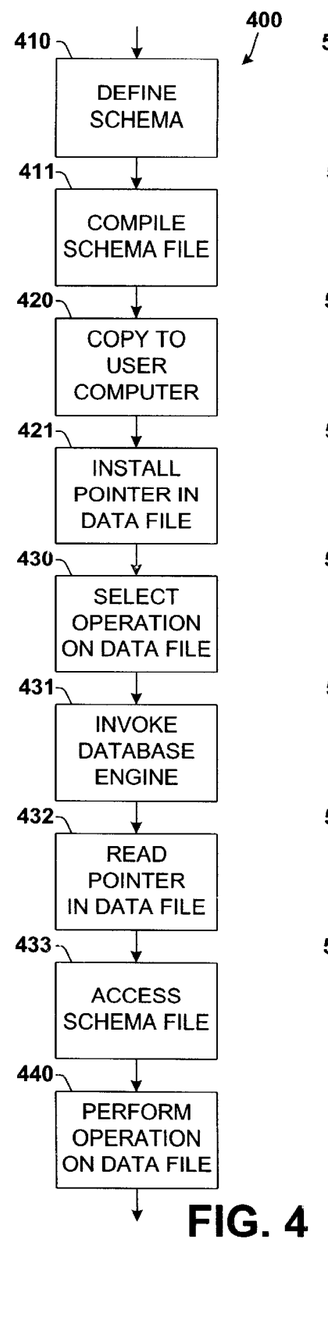
FIGS. 4–6 are flowcharts of methods for operating upon databases using different kinds of schema files according to the invention.

FIG. 4 shows a method 400 for operating upon a database by means of a separately stored standalone schema file. This is the method in which an application such as 320 that does not have an internally stored schema, operates upon the database. Block 410 begins the method when a programmer, database administrator, or other user defines a desired database schema as described above. Block 411 compiles the human-readable definition into compiled schema file 231, FIG. 2, which is a compressed binary format. Block 420 copies file 231 to a user's computer, from a physical medium, by download, or any other means, storing it at a known location. It is significant to note that file 310 can be created at any time, independently of the time the schema file is created, and before or after data are placed in it. Block 421 places a pointer or other identifier 311 to file 231 in data file 310. Because pointer 311 contains a version number as well as a unique identifier of schema file 231, the data file is protected against modification by a program using the wrong schema.

In block 430, a client application program such as 320 selects an operation upon a particular database 310, which is then accessed by block 431 by invoking database engine 330. Block 432 finds and reads reference pointer 311 in order to determine the schema that applies to the data. That is, because application program 320 does not have its own internal representation of the schema, the only way that it can access the data in file 310 is via the standalone compiled schema file 231, which database engine 330 finds via the pointer 311 stored in the file. Although the pointer or identifier requires a small amount of space in the data file, it is very much less space than the conventional method of storing the entire schema itself in the data file.

Block 433 makes the appropriate schema file 231 available to the database engine 330. Database 310 can have multiple reference pointers 311. In that case, application 320 asks engine 330 to obtain a list of installed schemata, to resolve the schema using a catalog, and install reference pointer 311 to it. It is important to note that engine 330, rather than application 320, resolves the schema, because the application program might resolve it incorrectly. Block 440 performs the actual operation in engine 330, using schema file 231 to find the location of particular data within file 310, to select functions appropriate to the data types of the data, and to perform all other functions of a conventional embedded schema.

Any of the blocks in FIG. 4 can be repeated. For example, method 400 can be employed to construct multiple files for many different databases to be selectively accessed by generic browser 320. Copies of the same schema can be downloaded to different users' computers. For instance, a common schema for address books can be transmitted to many users, all of whom construct their own individual data files. One significant application of the invention is to disseminate a component library for programs. The data in this library encompasses thousands of classes and type definitions that must be accessed quickly and in different ways. Pluggable schema files cooperate with compressed data file to deliver this library quickly and to enhance performance in its use.

Figure 5:
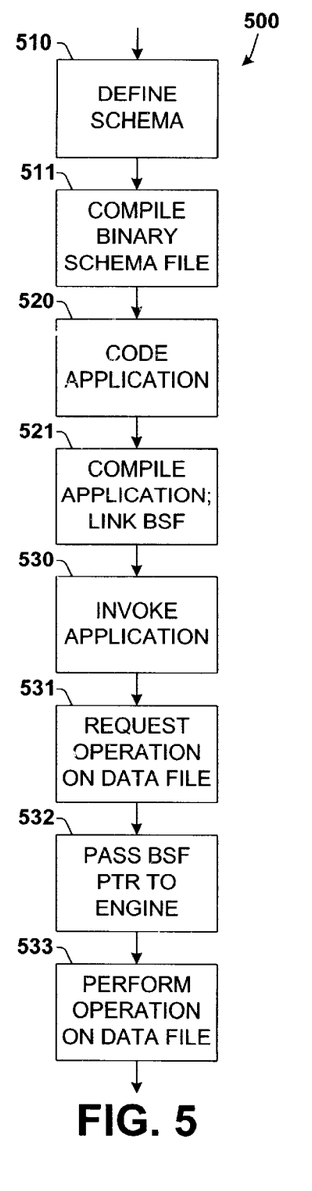

FIG. 5 is a method 500 for operating upon a database 310 via an embedded schema 232C in connection with an application program such as 340. Block 510 defines the schema in the same way as block 410. As evident in FIG. 2, the same initial definition 210 serves in all capacities, so that one may design the schema entirely independently of the manner in which it will be used to access the database 310 to which it applies. Block 511 compiles the definition 210 into a representation 232 of the schema, which, as noted, can be a header file or a binary form of the .clb file 231. In block 520, a programmer codes the client application 340 in a convenient language such as C or C++ source code. During this operation, the programmer merely includes schema file in the code; in C or C++. This is done by placing the schema in a compiler directive statement such as an "#include" statement. In block 521, the schema file is linked to the application code modules as they are being compiled in a conventional compiler. Again, the actual database file 310 can be set up and/or filled with data at any time, before or after the application program is written or transmitted to users.

A user invokes application 340 in block 530. Whenever the application invokes a database operation, such as in block 531, block 532 passes pointer 341 to engine 330. This allows engine 330 to access schema file 232C when it performs the requested operation 533 on the database file 310.

Figure 6:
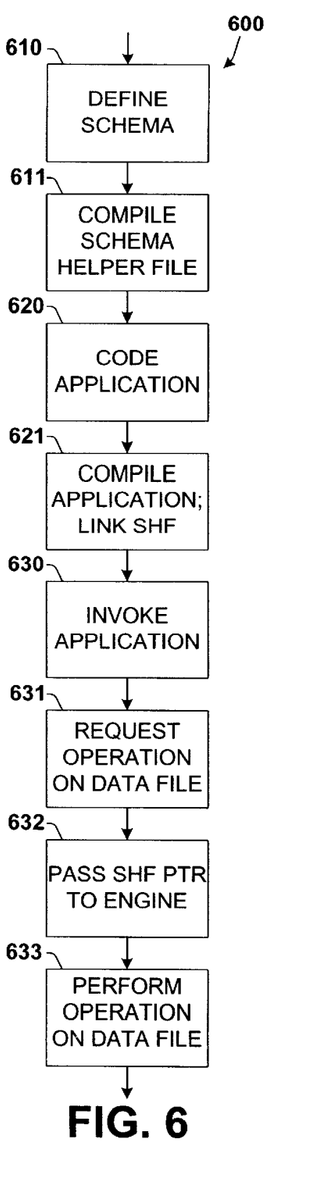

FIG. 6 is a method 600 employing a helper file 233 in an application program 350, FIGS. 2 and 3. Block s 610–632 correspond to blocks 510–532 in FIG. 5. As stated above, helper file 233 (and its compiled form 233C) do not represent a schema itself, but rather provide faster or simpler ways to perform certain operations on certain data files by substituting specific code for the more general code of engine 330 for those operations. That is, the macros encode knowledge of the schema, so that the engine need not test for certain conditions or perform other operations that would not apply to the particular schema In FIG. 6, the pointer 351 references particular macros that apply to the operation requested in block 631.

In block 633, engine 330 performs the operation using the macros supplied via pointer 351. That is, the macros hardcode some or all of the schema, and thus allow the engine to perform at least some operations upon the data file 310 without using an explicit schema. This aspect of the invention is especially useful for application programs 350 having limited function, such as programs for updating data files or for providing frequent fixed-format reports. As noted above, an application having a helper file 233C can also have a schema file 232C for performing additional or different operations according to method 500. Also, such an application can alternatively or additionally access database file via a standalone schema file 231 according to method 400.

Methods 500 and 600 employ the version number of the pointer to ensure that application program 340 or 350 can only operate on the schema version for which it was defined.

An extension envisages that accessing an earlier version data file 310 with a later version schema file 231 could perform an update on the data file. For example, a later schema might add a column for e-mail address to a table listing employee addresses and telephone numbers. Accessing the old data table with the new schema file could then automatically build the new column into the table, filling all records with a null or other default value until real values are entered at a later time.

What is claimed is:

1. A method for processing relational databases having data files, comprising:
   defining a schema of the databases as a script;
   compiling the script into a first representation of the schema and a second representation of the schema independent of the first representation;
   constructing an executable application program for processing the databases; and
   installing the representation of the schema in the executable application program such that the schema is stored separately from the data file of the relational databases processed by the application program.

2. A medium containing instructions and data for executing the method of claim 1 on a programmable digital computer.

3. A method according to claim 1, wherein the schema includes definitions of tables, columns for the tables, and data types for the columns.

4. A method according to claim 1, wherein the schema further includes at least one index.

5. A method according to claim 1, the first representation being a helper file containing structural definitions for the tables and a set of macros.

6. A method according to claim 1, further comprising installing the first representation in a user computer independently of the application program.

7. A method for processing relational databases with an application program, comprising:
   recording a desired schema for the databases as a human-readable script in a source format;
   compiling the script into a representation capable of being included in the code of the application program, such that the schema forms a part of the application program rather than a part of the databases; and
   a globally unique schema identifier included in the representation.

8. A medium containing instructions and data for executing the method of claim 7 on a programmable digital computer.

9. A method according to claim 7, wherein the representation further includes a version number.

10. A method according to claim 7, wherein the schema includes definitions of tables and columns for the tables.

11. A method according to claim 10, wherein the schema further includes at least one index.

12. A method according to claim 10, wherein the representation includes structural constructs representing the definitions of the tables and columns.

13. A method for processing relational databases with an application program, comprising:
   selecting one of the databases for processing;
   accessing a data file of the selected database;
   reading a pointer in the data file indicating a schema file stored independently of the data file;
   accessing the schema file separately from the data file; and accessing database within the data file in accordance with the schema file.

14. A medium containing instructions and data for executing the method of claim 13 on a programmable digital computer.

15. A method according to claim 13, wherein the pointer contains an identifier for locating the schema file.

16. A method according to claim 13, wherein the pointer contains a version identifier.

17. A method for processing relational databases having data files organized according to a defined schema, comprising:
   defining application program code for performing at least one function upon the databases;
   including with the application code a schema file separate from the data files and representing the schema of the data files, such that the function operates upon the data files in accordance with the schema; and
   a further program for executing the function, the application code passing the schema file to the further program for locating particular data in the data files.

18. A medium containing instructions and data for executing the method of claim 17 on a programmable digital computer.

19. A method according to claim 17, the application code passes the schema file to the further program for locating particular data in the data files by passing a pointer to the schema file to the further program, the further program accessing the schema file through the pointer.

20. A method according to claim 17, wherein the further program is a database engine.

21. A method according to claim 19, wherein the schema file includes structural constructs representing definitions of the tables and columns in the schema.

22. A method according to claim 21, wherein the constructs are separately integrated into the application code.

23. A method according to claim 17, wherein the schema file further includes at least one index.

24. A system for processing a relational database, comprising:
   a data file for containing data for the database according to a schema;
   a schema definition for the database,
   a compiler responsive to the schema definition for producing a first representation of the schema independent from the data file and a second representation of the schema independent of the first representation.

25. A system according to claim 24, wherein the schema definition is a human-readable file.

26. A system according to claim 24, wherein the first representation is a binary representation.

27. A system according to claim 24, wherein the schema definition includes specifications of tables and columns.

28. A system according to claim 24, wherein the first representation includes constructs embodying the specifications of the tables and columns.

29. A system of relational databases, comprising:
   a plurality of schema files each representing the schemata of different ones of the databases;
   a plurality of data files separate from the schema files and each containing relational data organized according to a corresponding one of the schemata; and
   a pointer in each of the data files identifying one of the schema files representing the corresponding schema.

30. A system according to claim 29, further comprising an application program for selectively accessing any one of the data files and for accessing that one of the schema files identified by the pointer in the accessed data file.

31. A system according to claim 30, further comprising a database engine coupled to the application program for performing an operation on the one data file in accordance with the one schema file accessed by the application program.

32. A system for processing a relational database, comprising:
 a data file containing relational data organized according to a schema;
 an application program separate from the data file and including a representation of the schema of the data file, code responsive to the representation for performing an operation on the data file in accordance with the schema; and
 a further program that operates upon the data file in accordance with the schema, the application program passing the representation of the schema file to the further program for accessing data in the data file.

33. A method according to claim 32, the application program passes the schema file to the further program by passing a pointer to the schema file to the further program.

34. A system according to claim 32, the further program comprising a database engine coupled to the application program for executing the operation upon the data file in response to receiving the representation of the schema from the application program.

35. A system for processing a relational database, comprising:
 a data file containing relational data organized according to a schema;
 a schema file separate from the data file and containing constructs representing the schema;
 an application program separate from the data file and including at least one of the constructs taken from the schema representation and further including code for manipulating data according to the at least one construct; and
 code residing in the schema file for manipulating the at least one construct taken from the schema.

36. A system according to claim 35, wherein at least some of the code in the application program is taken from the schema file.

37. A relational database, comprising:
 a data file for containing relational data for the database according to a schema;
 a schema file entirely separate from the data file for representing the schema of the relational data to an application program that accesses the data file;
 a representation of the schema file compiled into the application program; and
 a further program that operates upon the data file in accordance with the schema, the application program passing the representation of the schema file to the further program for accessing data in the data file.

38. A method according to claim 32, the application program passes the schema file to the further program by passing a pointer to the schema file to the further program.

* * * * *